2,916,489

SULTAMES

Burckhardt Helferich, Bonn, and Robert Behnisch, Wuppertal-Elberfeld, Germany, assignors to Schenley Industries, Inc., New York, N.Y., a corporation of Delaware No Drawing. Application August 22, 1956
Serial No. 605,492

Claims priority, application Germany September 9, 1955

1 Claim. (Cl. 260—243)

The present invention relates to sultames and more particularly to N-substituted alkane sultames, in which the N-substituents consist of aromatic, hetero aromatic or araliphatic radicals.

Such N-substituted alkane sultames have not been described heretofore. The so called "naphtsultame" described in "Berichte der Deutschen Chemischen Gesellschaft," vol. 27, 2137 (1894), is not an alkane sultame since it does not possess a hydrocarbon chain between the amine nitrogen and the sulfone group. None of the alkane sultames hitherto described have obtained any practical utility especially as therapeutical agents.

We have discovered that the new alkane sultames of this invention and especially their derivatives substituted in the aryl nucleus, furthermore the N-hetero aryl- and N-aralkyl alkane sultames possess valuable therapeutical properties. Thus, for instance the N-(p-amino phenyl)-butane sultame shows anti-convulsive activity in mice already in doses of 0.2–0.25 milligram per 20 grams of mouse, while the lethal dose (LD) is between 25 and 30 milligrams per 20 grams of mouse. The same compound has at the same time anesthetic properties. It is active in lowering the body temperature and is also active against allergic asthma.

The N-substituted alkane sultames of the invention may be obtained according to various methods.

For instance any substituted or unsubstituted aryl amine, hetero aryl amine or aralkyl amine containing at least one primary amino group can be reacted with γ- or δ-halogeno alkane sulfohalides, preferable in the presence of acid-binding agents. The N-substituted halogeno alkane sulfonamides, obtained as intermediates may be converted into the corresponding N-substituted alkane sultames by heating with alkali metal hydroxides or other acid-binding agents or simply by heating. The sulfonamides obtained as intermediates need not be recovered so that the process can be carried out in a single step.

Instead of the γ- or δ-halogeno sulfohalides other esters of hydroxy sulfonic acid halides, for instance esters with carboxylic acids like acetic or benzoic acid, or with sulfonic acids, like methane sulfonic acid or p-toluene sulfonic acid may be employed. During ring closure of the sulfonamide the corresponding carboxylic acid or sulfonic acid is then split off in the formation of the sultame. If the γ- or δ-hydroxy sulfohalide itself is employed water is split off during ring closure.

In an analogous manner the ring closure to yield the N-substituted alkane sultame may also be carried out by employing as starting material instead of the above named esters the corresponding alkyl-, aryl- or aralkyl ethers and splitting off the corresponding alcohol or phenol during the reaction.

A modified process for the production of the N-substituted alkane sultames or their derivatives substituted in the nucleus consists in first reacting a primary amine with a halogeno alkane substituted in the γ- or δ-position with a sulfonic acid radical and then effecting ring closure on the secondary amine thus obtained. Thus, for instance 1-chloro butane-4-sulfonic acid can be reacted with a primary aromatic amine to yield the corresponding N-arylamino butane sulfonic acid, which by splitting off water is converted into the sultame. The splitting off of water may be effected by contacting the free sulfonic acid or one of its salts with phosphorus oxychloride or phosphorus trichloride. The N-arylamino butane sulfonic acid can also be obtained by the reaction of a primary aromatic amine with a sultone (see Ann.d.Ch., 565, 29 (1949)).

Instead of the γ- or δ-halogeno sulfonic acid, sulfonic acid esters of the corresponding hydroxy sulfonic acids may be employed for the production of the secondary amines used as intermediates.

Likewise instead of the corresponding free sulfonic acids substituted in the γ- or δ-position their esters may be employed or generally such compounds, which in the γ- or δ-position to the halogen atom carries such substituents as can be subsequently converted into the sulfonic acid groups. Such substituents are for instance the mercapto group, the disulfide group and the rhodane group, which after the preparation of the secondary amine may be converted into the sulfonic acid group by oxydation.

Such radicals are also halogen atoms or sulfonyloxy groups which can be converted into sulfonic acids by reaction with alkali metal sulfites.

Another modification of the process of producing N-substituted alkane sultames consists in introducing new substituents into the N-substituted alkane sultames or into the secondary amines or the sulfonamides used as intermediate products. Such substituents can be introduced for instance by nitrating, sulfurating or halogenating. Substituents already present in the molecules may be modified, for instance an acyl amino group may be deacetylated, an alkoxy group or acyloxy group may be saponified, a nitro group may be reduced, an amino group may be diazotized.

The processes described herein before are applicable also to aromatic, hetero aromatic or araliphatic amines, having more than one free amino group. In such cases compounds with more than one alkane sultame nucleus result.

Example 1

9.55 parts by weight of 4-chloro butane sulfochloride, 50 parts by weight of water and 7.0 parts by weight of aniline are stirred at room temperature within half an hour with a solution of 15.1 parts by weight of sodium carbonate in 50 parts by volume of water. The mixture is stirred for a further two hours at room temperature, then refluxed for two hours and subsequently strongly acidified with hydrochloric acid while still hot and cooled. The sultame of 4-(phenylamino)-butane sulfonic acid, which crystallizes slowly, is sucked off, washed first with water, then with dilute sodium hydroxide solution and again with water and dried. The yield amounts to 8.80 parts by weight (83% of the theoretical). After once recrystallizing from methanol the substance melts at 109–110° C. (Copper block).

Example 2

5.35 parts by weight of m-toluidine are mixed with 50 parts by volume of water and half-concentrated hydrochloric acid until it dissolves (pH about 6). 9.55 parts by weight of 4-chloro butane sulfochloride are added to this solution. The solution is then added at room temperature with stirring to 50 parts by weight of 10% sodium acetate solution. After stirring for three hours the condensate, which is at first a syrup and then becomes crystalline, is sucked off, dissolved in 8% sodium hydroxide solution, filtered off from the undissolved residue and the m-toluodide of 4-chloro butane sulfonic acid precipitated by acidification. The yield amounts to 6.0 parts by weight. The substance melts at 73–74° C. after recrystallization from methanol.

4 parts by weight of this toluodide are dissolved in 50 parts by weight of a 5% sodium hydroxide solution and refluxed for one hour. The precipitated product is sucked off after cooling, washed with water and dried. The yield is 3.2 parts by weight (90% of the theoretical). The sultame of 4-(m-toluidino)-butane sulfonic acid obtained in this manner melts at 64–65° C. after recrystallization.

In the same manner the corresponding derivatives of o-toluidine and of p-toluidine are obtained. The sultame of 4-(o-toluidino)-butane sulfonic acid melts at 73–74° C. The sultame of 4-(p-toluidino)-butane sulfonic acid melts at 79° C.

It is not necessary to isolate as an intermediate the corresponding anilide of 4-chlorobutane sulfonic acid.

*Example 3*

5.73 parts by weight of 4-chloro butane sulfochloride, which is dissolved in 60 parts by volume of benzene, are refluxed for six hours with 4.14 parts by weight of m-nitraniline and 2.57 parts by weight of pyridine. After the solvent is evaporated, the dark residue is dissolved in 5% sodium hydroxide solution. The solution is filtered and acidified with hydrochloric acid. The precipitate, the m-nitranilide of 4-chloro butane sulfonic acid is sucked off, washed with water and dried. The yield amounts to 7.1 parts by weight (80% of the theoretical). After recrystallization from methanol the substance, a yellow crystalline powder, melts at 73–74° C.

5 parts by weight of this nitranilide are heated to the boil for one hour in 80 parts by volume of a 5% sodium hydroxide solution. The sultame of 4-(m-nitrophenyl-amino)-butane sulfonic acid, which is obtained, is sucked off after cooling, washed with water and dried. The yield is 4.2 parts by weight (95% of the theoretical). Recrystallized from ethanol the substance, which is obtained as yellow needles, melts at 137° C.

In the same manner the p-nitro-anilide of 4-chloro butane sulfonic acid (intermediate of the melting point 111–112° C., yellow needles) and the sultame of 4-(p-nitranilino)-butane sulfonic acid (melting point 122–123° C., yellow needles) may be obtained.

*Example 4*

6.15 parts by weight of o-anisidine are dissolved in a mixture of 50 parts by volume of water and 50 parts by weight of half concentrated hydrochloric acid until solution occurs and the pH is about 6. 9.55 parts by weight of 4-chloro butane sulfochloride are added thereto at room temperature. Within two hours 50 parts by volume of a 10% sodium acetate solution are dropped thereto. After stirring for three hours the solid brown condensate, the anisidide of 4-chlorobutane sulfonic acid, is sucked off, dissolved in 5% sodium hydroxide solution, filtered off from the undissolved, again precipitated by acidification, washed with water and dried. The yield is 11.5 parts by weight (80% of the theoretical). The melting point is 62–63° C.

9 parts by weight of this o-anisidide are refluxed for one hour in 50 parts by volume of a 5% sodium hydroxide solution. The precipitated product is sucked off after cooling, washed with water and dried. The yield of this sultame of 4-(o-anisidine)-butane sulfonic acid amounts to 6.0 parts by weight (80%). After recrystallization from methanol the substance melts at 79–80° C.

In the same manner the p-anisidide of 4-chloro butane sulfonic acid (as intermediate, melting point 81–82° C.) and the sultame of 4-(p-methoxy-phenyl-amino)-butane sulfonic acid of the melting point 80–81° C. is obtained.

*Example 5*

5 parts by weight of 4-chloro butane sulfochloride and 4.7 parts by weight of p-amino-aceto anilide are mixed with shaking or stirring for three hours at room temperature with a solution of 6 parts by weight of sodium acetate in 50 parts by volume of water. The condensate obtained, the 4-chloro butane sulfonic acid-(p-aceto-amino-anilide) is sucked off and dissolved in sodium hydroxide solution. The undissolved is filtered off and the substance is again precipitated by acidification. The yield amounts to about 70% of the theoretical (5.5 parts by weight). The melting point is 119° C. (Kofler block).

3 parts by weight of this anilide are refluxed for three hours with a solution of 3.1 parts by weight of sodium carbonate in 40 parts by volume of water. After cooling the undissolved, the sultame of 4-(p-aceto-amino-phenylamino)-butane sulfonic acid, is sucked off, washed with sodium hydroxide solution and water and dried. The yield is 2.4 parts by weight (more than 90% of the theoretical). The crystallized substance melts at 178° C. It can be deacetylated in very good yields by heating with acid, for instance half an hour with 35 parts by volume of 20% sulfuric acid. The melting point of the deacetylated substance is 143° C. (Copper block).

*Example 6*

2.88 parts by weight of α-naphthyl amine, dissolved in 50 parts by volume of water, and the amount of hydrochloric acid necessary for solution (pH 4–5) are added with strong stirring to a suspension of 3.82 parts by weight of 4-chloro butane sulfochloride in 100 parts by weight of water. By adding a sodium acetate solution of 10% the mixture is kept neutral. After stirring for four hours the condensate is sucked off. Its solution in 5% sodium hydroxide solution is purified by filtration and treatment with charcoal. The α-naphthyl amide of 4-chlorobutane sulfonic acid is recovered by precipitating, sucking off, washing with water and drying, as an almost colorless product in a yield of about 2.5 parts by weight. After recrystallizing from methanol it has the melting point of 89–90° C.

2 parts by weight of this α-naphthyl amide, dissolved in 50 parts by volume of a 5% sodium hydroxide solution, are refluxed for one hour. The precipitated oil solidifies after cooling. It is sucked off, washed with water and dried. The yield of the sultame of 4-(α-naphthyl amino)-butane sulfonic acid amounts to 1.5 parts by weight (90% of the theoretical). The substance melts at 107–108° C.

*Example 7*

2.88 parts by weight of β-naphthyl amine are added with strong stirring to a suspension consisting of 3.82 parts by weight of 4-chloro butane sulfochloride in 100 parts by volume of water. The mixture is kept at a pH of about 7 by dropwise adding a 10% sodium acetate solution. After stirring for four hours a brown precipitate is sucked off, dissolved in 5% sodium hydroxide solution, again precipitated by acidification, washed with water and dried. The yield of this β-naphthyl amide of 4-chloro butane sulfonic acid amounts to 2.7 parts by weight (50% of the theoretical). The substance melts at 83–84° C. 2 parts by weight of this β-naphthyl amide are refluxed for one hour in 70 parts by volume of a 8% sodium hydroxide solution. The precipitate is sucked off after cooling, washed with water and dried. The yield of sultame of 4-(β-naphthyl-amino)-butane sulfonic acid is 1.3 parts by weight (75% of the theoretical). The substance melts at 125–126° C. after recrystallization from a mixture of water and methanol (1:3).

*Example 8*

A solution consisting of 7.8 parts by weight of the sodium salt of 4-chloro butane sulfonic acid and 50 parts by weight of water is refluxed for 7 hours with 7.5 parts by weight of aniline. It is then rendered alkaline. The excess of aniline is blown off with steam and the solution evaporated until dry. The sodium-4-chloro butyl sulfonate is extracted with methanol from the dry residue. The yield is 8.3 parts by weight (about 80% of the theoretical). 18 parts by weight of this sodium salt are heated to the boil in a reflux condensor with strong stirring with 100 parts by volume of phosphorus trichloride. The excess of phosphorus trichloride is evaporated and the residue is mixed with ice water. After some time a crystalline precipitate, the sultame of 4-(phenylamino)-butane sulfonic acid, is obtained. It is sucked off, washed with 5% sodium hydroxide solution, then with 5% of hydrochloric acid, and water and dried. The yield is 7.2 parts by weight (about 50% of the theoretical). The melting point is 109–110° C. (copper block).

Example 9

A solution of 7.8 parts by weight of sodium-4-chloro butane sulfonate in 50 parts by volume of water is refluxed for seven hours after the addition of 10 parts by volume of ethanol with 10.2 parts by weight of p-chloro aniline. The mixture is washed weakly alkaline. The unreacted p-chloro aniline is sucked off from the cool solution. The filtrate is evaporated and the sodium salt of 4-(-p-chloro-phenylamino)-butane sulfonic acid is obtained from the residue by extracting with methanol. The yield is 9.8 parts by weight (more than 85% of the theoretical).

7.5 parts by weight of this sodium salt are refluxed with stirring for one hour at 130° C. with 20 parts by volume of phosphorus oxychloride. The excess of phosphorus oxychloride is distilled off and the residue is mixed with ice water. The remaining oil becomes gradually crystalline upon stirring with water. The sultame of 4-(p-chloro-phenylamino)-butane sulfonic acid thus obtained is then purified by washing with dilute sodium hydroxide solution, with dilute hydrochloric acid and finally with water. The yield amounts to 3.2 parts by weight (50% of the theoretical). The compound melts at 67° C. (copper block) after recrystallization from methanol.

Example 10

100 parts by volume of a 20% sodium acetate solution are added within two hours with strong stirring to a mixture consisting of 3.62 parts by weight of p-phenylene diamine hydrochloride in 100 parts by volume of water and 7.64 parts by weight of 4-chloro butane sulfochloride. After stirring for a further three hours, the solid reaction product is sucked off, as much of it as possible dissolved in 5% sodium hydroxide solution and filtered. After acidifying the N,N'-di-(4-chloro-butane-sulfonyl)-p-phenylene diamine is filtered off, washed with water, and dried. The yield amounts to 3.2 parts by weight. The substance melts at 186–187° C. after recrystallizing from ethanol.

3 parts by weight of this product are refluxed for one hour in 50 parts by volume of a 8% sodium hydroxide solution. The precipitated disultame of p-phenylene-bis-(4-amino-butane-sulfonic acid) is filtered off, washed with water and dried. The yield is almost quantitative. After recrystallizing from dimethyl formamide the substance melts at 273–274° C.

Example 11

5.52 parts by weight of benzidine are mixed until dissolution in 150 parts by volume of water with half concentrated hydrochloric acid. 100 parts by volume of a 20% sodium acetate solution are dropwise added thereto with strong stirring within two hours after the addition of 11.46 parts by weight of 4-chloro butane sulfochloride. After stirring for three hours the reaction product is sucked off and as much as possible thereof dissolved in an 8% sodium hydroxide solution. The solution is filtered and acidified. The N,N'-di-(4-chlorobutane sulfonyl)-benzidine precipitates. It is washed with water and dried. The yield is 9.25 parts by weight. The substance melts at 221–223° C. (copper block under the microscope).

6 parts by weight of this substance are refluxed for one hour in 100 parts by volume of a 5% sodium hydroxide solution. The resulting disultame of 4,4'-diphenyl-bis-(4-amino-butane sulfonic acid) is sucked off after cooling, washed with water and dried. The yield amounts to 4.5 parts by weight. The substance melts at 274–275° C. after recrystallizing from dimethyl formamide.

Example 12

1.28 parts by weight of the sultame of 4-(m-nitranilino)-n-butane sulfonic acid are refluxed for five hours in a mixture consisting of 30 parts by volume of ethanol, 30 parts by volume of water and 5 parts by weight of $Na_2S; 9H_2O$. After one hour a clear yellow solution is obtained. After cooling the sultame of 4-(m-aminophenylamino)-n-butane sulfonic acid crystallizes in long needles. The needles are filtered off, dissolved in hydrochloric acid and rendered alkaline after purification with charcoal. The amino sultame thus precipitated can further be purified by recrystallizing from methanol. The yield amounts at least to 1 part by weight or 88% of the theoretical. The substance melts at 157–158° C.

In an analogous manner the sultame of 4-(p-nitranilino)-n-butane sulfonic acid is reduced to sultame of 4-(p-amino-phenylamino)-butane sulfonic acid. The yield is about 70% of the theoretical. After recrystallizing from water/methanol (1:1) the melting point of the substance is about 144–145° C.

Example 13

1.06 parts by weight of the sultame of 4-anilino-butane sulfonic acid are dissolved at 0° C. in 30 parts by volume of 86% nitric acid. After standing for half an hour the solution is poured into about 400 parts by weight of ice. After about half an hour at 0° C. the precipitated sultame of 4-(2,4-dinitranilino)-butane sulfonic acid is separated from the mother lye, washed with water and dried. The yield is more than 85% of the theoretical. After recrystallizing from ethanol the substance, yellow crystals, melts at 170° C.

2.25 parts by weight of the sultame of 4-(p-toluidino)-butane sulfonic acid are dissolved in a mixture of 40 parts by volume of 65% nitric acid and 40 parts by volume of concentrated sulfuric acid and stored for two hours at room temperature. 800 parts by weight of ice water are then poured thereto, whereupon the sultame of 4-(dinitro-p-toluidino)-butane sulfonic acid precipitates. The yield is 1.2 parts by weight, the melting point 204° C. after recrystallizing from ethanol. The substance crystallizes in yellow needles.

Example 14

A mixture consisting of 7.1 parts by weight of 3-chloro propane sulfochloride, 5.6 parts by weight of aniline and 30 parts by volume of water is well stirred for a quarter of an hour at room temperature. The temperature rises slightly. To this mixture there is then slowly added while stirring a solution of 6.4 parts by weight of $Na_2CO_3$ in 30 parts by volume of water within one hour. It is stirred for a further two hours and twice shaken out with ether after rendering alkaline. The aqueous layer is acidified, the precipitated oil separated, for instance taken up in ether, which is evaporated, and refluxed for two hours with a solution of 12.8 parts by weight of $Na_2CO_3$ in 50 parts by volume of water. After cooling the sultame of 3-(anilino)-propane sulfonic acid is obtained as an oil, which gradually solidifies. It is first washed with sodium hydroxide solution and then with water and dried. The yield is about 80% of the theoretical. After recrystallizing from a mixture of methanol and water, the substance, colorless leaflets, melts at 119–120° C.

Example 15

30 parts by weight of 3-chloro propane sulfochloride, 38.1 parts by weight of p-amino aceto anilide, 46 parts by weight of water-containing sodium acetate and 300 parts by volume of water are well stirred for six hours at room temperature. The resulting reaction product, the 3-chloro propane sulfonic acid-(p-aceto amino anilide) is separated, washed quickly with hydrochloric acid and dissolved in cold dilute sodium hydroxide solution. After shaking out with ether (for removal of unreacted amine) and treatment with charcoal the solution is acidified with hydrochloric acid. The precipitated oil becomes solid after some time. After washing with water and drying the yield amounts to about 40% of the theoretical. This intermediate melts at 160–161° C.

20 parts by weight of this 3-chloro propane sulfonic acid (aceto amino anilide) are refluxed for three hours with a solution of 22 parts by weight of $Na_2CO_3$ in 200 parts by volume of water. After cooling the sultame of N-3-(p-acetaminophenylamino)-propane sulfonic acid crystallizes. The yield is more than 80% of the theoretical. The substance can be purified by recrystallizing from water. It then contains crystal water. The air-dry product melts at 142° C., the water-free substance at 165–166° C.

By heating this substance for about two hours with a 10% sodium hydroxide solution the acetyl group attached to the nitrogen atom can be hydrolyzed off. The N-(p-aminophenyl)-1.3 propane sultame thus obtained in a yield of about 85% of the theoretical melts at 155–156° C.

Example 16

1.91 parts by weight of 4-chloro butane sulfochloride and 0.94 part by weight of 2-amino-pyridine are refluxed for two hours in 20 parts by volume of benzene, whereupon a brown syrup separates. The cooled mixture is extracted with 30 parts by volume of a 10% sodium hydroxide solution. The aqueous layer is purified with charcoal and acidified to a pH of about 5–6. 0.55 part by weight of N-(4-chloro butane sulfonyl)-2-amino-pyridine are obtained. The compound melts at 127–128° C. after recrystallization from methanol.

0.7 part by weight of this substance is dissolved in 5 parts by volume of a 8% sodium hydroxide solution and the mixture heated to about 80° C. for five minutes. The precipitated oil, the sultame of 4-(2-pyridylamino)-butane sulfonic acid solidifies in crystals after some time. After recrystallizing from some methanol the compound melts at 54–55° C. The yield of the crude product is more than 40% of the theoretical.

Example 17

According to known methods the corresponding N-(aminoaryl)-sultames may be obtained by reducing N-(nitroaryl)-sultames.

10 parts by weight of m-nitrophenyl-(N)-butane sultame in 150 parts by volume of alcohol takes up the calculated amount of hydrogen within a short time at room temperature in the presence of Raney nickel. From the solution, which is filtered hot from the catalyst, 5.15 parts by weight of N-(m-amino-phenyl)-butane sultame are obtained after cooling in colorless needles of the melting point 156–157° C. By working up the mother lye (precipitation with water and distilling off the main amount of alcohol) the yield amounts to a total of almost 70% of the theoretical.

In the same manner the N-(o-aminophenyl)-butane sultame may be obtained from o-nitro-phenyl-(N)-butane sultame in a yield of more than 80% of the theoretical as a colorless crystalline substance from the melting point of 132–133° C.

Also the sultame of 4-(2-diaminoanilino)-butane sulfonic acid can be obtained as colorless needles of the melting point 190° C. by reduction of the sultame of 4-(2,4-dinitro anilino)-butane sulfonic acid in a yield of more than 90% of the theoretical.

Example 18

5.2 parts by weight of butane sultone(1,4) and 4.1 parts by weight of o-tuluidine are refluxed for 30 minutes in 25 parts by volume of xylene. A sticky, tough mass separates on the vessel (4-(o-toluidino)-butane sulfonic acid). The solvent is evaporated and the residue refluxed for 90 minutes with 105 parts by volume of phosphorus oxychloride, whereupon it gradually dissolves. The excess of phosphorus oxychloride is evaporated under reduced pressure. The residue, a tough mass, is mixed with ice water. Sodium hydroxide solution is added with stirring to keep the solution alkaline. Thereupon the sultame of 4-(o-toluidino)-butane sulfonic acid separates in colorless and crystalline form. It can be recrystallized from a mixture of water and methanol. The yield is 5.5 parts by weight.

In analogous manner the 3,4,6-trichloro anilino-(4)-butane sulfonic acid can be obtained as crystals of the melting point 210–213° C. by melting together with stirring equimolecular proportions of 3,4,6-trichloro-aniline and 1,4-butane sultone and heating to about 200–210° C. The yield is about 70% of the theoretical.

By refluxing for 90 minutes with phosphorus oxychloride this compound is converted into the sultame of 4-(3,4,6-trichloroanilino)-butane sulfonic acid in excellent yield (more than 95%). The compound is a colorless, finely crystalline product of the melting point 166–167° C.

Example 19

To a solution of 2.8 parts by weight of p-(β-diethyl-aminoethoxy)-aniline in 100 parts by volume of ether there are added within one hour with stirring and cooling a solution of 19 parts by weight of 1,4-chloro butane sulfochloride in 50 parts by volume of ether. Thereupon the hydrochloride of the corresponding sulfanilide precipitates partly as an amorphous, partly as a crystalline mass. It is dissolved in such an amount of aqueous sodium hydroxide solution (8 parts by weight of NaOH in 150 parts by volume of water), that the hydrochloric acid is neutralized and the sodium salt of the sulfanilide is obtained. This alkaline solution is heated for a short time to 70° C. (15 minutes) and again cooled. The sultame of 4-(p-β-diethylamino ethoxy-anilido)-butane sulfonic acid separates. After dissolving in 2N hydrochloric acid and carefully precipitating with 2N sodium hydroxide solution the crystalline substance can be obtained of the melting point 52° C.

Example 20

2.27 parts by weight of the sultame of 4-(p-amino-anilino)-butane sulfonic acid are dispersed in about 10 times its volume of water. 15 parts by weight of concentrated sulfuric acid are added, whereupon the sultame dissolves. On cooling to about 0° C., the sultame separates and yields a fine dispersion. To this dispersion there are slowly added while cooling further and stirring vigorously a solution of 0.8 part by weight of sodium nitrite in 10 parts by volume of water. After the addition of some copper powder the clear solution is refluxed for 25 minutes calculated from the beginning of the development of gas bubbles. The solution is buffered with sodium acetate and cooled. The sultame of 4-(p-hydroxy anilino)-butane sulfonic acid separates in scaly crystals. It can be purified by recrystallizing from water. The yield amounts to more than 40%. The compound melts at 159–160° C.

Example 21

One part by weight of 4-phenoxy-butane sulfonic acid anilide(1) are dissolved in dilute sodium hydroxide solution (0.2 part by weight in 20 parts by volume of water). After adding 2 parts by weight of aluminum oxide the mixture is heated in an autoclave to 270–280° C. for 24 hours. After cooling a sediment, which is at first oily, becomes quickly crystalline. The undissolved matter is sucked off and the residue extracted with 25 parts by volume of chloroform. When the solvent is evaporated a crystalline residue, the N-phenyl butane sultame(1,4) remains in a yield of 0.52 part by weight. By recrystallizing once from methanol/water the compound has the melting point 101° C.

*Example 22*

21.4 parts by weight of 4-acetoxy-n-butane-1-sulfonic acid chloride are added to a solution of 12.3 parts by weight of p-anisidine in 10 parts by volume of concentrated hydrochloric acid and 50 parts by volume of water. An aqueous solution of 20 parts by weight of sodium acetate is added thereto dropwise with strong stirring within two hours at room temperature. After stirring a further hour the 4-acetoxy-n-butane-1-sulfonic acid (p-anisidide), obtained is sucked off, taken up in 2 N NaOH with ice cooling and precipitated again after purification with charcoal by slowly acidifying. Its melting point is 79° C. after recrystallizing from a mixture of alcohol and water.

The ring closure of this anisidide can be effected in various ways:

(*a*) In a roomy vessel the anisidide is heated for one hour to 200° C. After cooling the residue is extracted by boiling with 2 N-sodium hydroxide solution. The sultame of 4-(p-anisidino)-n-butane-1-sulfonic acid, which remains undissolved, melts at 81° C. after recrystallizing from methanol/water.

(*b*) 3 parts by weight of the anisidide are dissolved in sodium hydroxide solution (0.4 part by weight of NaOH in 10 parts by volume of water) and converted into the sodium salt by evaporating and drying. This is heated to about 190° C. for six hours. The reaction product is extracted with 2 N sodium hydroxide solution and the undissolved residue, the sultame, is recrystallized as described sub (*a*).

(*c*) 2 parts by weight of the anisidide are refluxed for three hours with 23 parts by volume of fuming hydrochloric acid (37%). The undissolved residue is extracted with hot 2 N-sodium hydroxide solution and the insoluble residue, the sultame, is recrystallized from alcohol/water.

The 4-acetoxy-n-butane sulfonic acid anilide can be obtained in the same manner as the anisidide. Ring closure yielding the sultame of 4-anilino-n-butane-1-sulfonic acid can be effected according to the same methods as described for the anisidide. Alternatively, the compound can be slowly distilled at a pressure of 0.01 mm. and 190–200° C. Thereupon the sultame is recovered in a very pure form, having a melting point of 110–111° C.

*Example 23*

12.3 parts by weight of p-anisidine are dissolved in 10 parts by volume of concentrated hydrochloric acid and 50 parts by volume of water. To this solution there are added 27.6 parts by weight of 4-benzoyloxy-n-butane-1-sulfonic acid chloride and then there are added inside about two hours while vigorously stirring 20 parts by weight of sodium acetate in water. After a further hour of stirring the resultant insoluble 4-benzoyloxy-n-butane-1-sulfonic acid anisidide is extracted while cooling with ice with 2-N-sodium hydroxide solution. The anisidide is precipitated from this solution by acidifying slowly. After recrystallizing from ethanol the compound melts at 66° C.

The ring closure to yield the sultame may be effected as described for the 4-acetoxy compound as follows:

(*a*) The sodium salt of the anisidide is heated for one hour in an open vessel to 220° C. When the melt has cooled it is shortly boiled with 2-N-sodium hydroxide solution in order to remove alkali soluble ingredients. The sultame of 4-(p-anisidino)-n-butane-1-sulfonic acid, which is insoluble in sodium hydroxide solution, is recrystallized from a mixture of methanol and water. It has the melting point of 81° C.

(*b*) 5 parts by weight of the anisidide are refluxed for three hours with 20 parts by volume of fuming hydrochloric acid (37%). The undissolved residue is extracted with 2-N-sodium hydroxide solution and the sultame which constitutes the part insoluble in sodium hydroxide solution is recrystallized from a mixture of methanol and water.

*Example 24*

3 parts by weight of 4-acetoxy-n-butane-1-sulfonic acid-p-anisidide are refluxed in 40 parts by volume of half concentrated hydrochloric acid. The 4-hydroxy-n-butane-1-sulfonic acid-p-anisidide obtained by splitting off the acetyl radical is sucked off. After recrystallizing from a mixture of ethanol and water it melts at 100–102° C. By heating this hydroxy anisidide in an open vessel to 200° C. for one hour, dissolving the alkali soluble ingredients of the melt, and recrystallizing the alkali insoluble parts, the sultame of 4-(p-anisidino)-n-butane-1-sulfonic acid is obtained. After recrystallizing from a mixture of ethanol and water the sultame melts at 81° C.

Another possible method for the ring closure is as follows: The 4-hydroxy anisidide is refluxed two hours with an excess of phosphorus oxychloride, the excess of phosphorus oxychloride is evaporated, the residue boiled with 2-N-sodium hydroxide solution and the alkali insoluble part is recrystallized from a mixture of ethanol and water.

In an analogous manner N-phenyl-sultame may be obtained from 4-hydroxy-n-butane-1-sulfonic acid anilide.

*Example 25*

26.6 grams of 4-methoxy-3-nitro aniline sulfate in 200 milliliters of water are combined with vigorous stirring with 19 grams of 4-chloro butane sulfochloride and then slowly with a solution of 16.4 grams of sodium acetate in 100 milliliters of water. An oily product precipitates which becomes solid soon. It is purified by dissolving in cold sodium hydroxide solution and again precipitating with acid. After recrystallizing the intermediate product, 4-chloro-butane sulfonic acid nitro anisidide melts at 78° C.

Ring closure to 4-methoxy-3-nitro-phenyl-N-butane sultame may be effected by heating the crude solution of the anisidide in 2-N-sodium hydroxide solution for half an hour on the water bath. During this time the sultame separates from the solution. After recrystallizing from ethanol it melts at 133–134° C.

By reducing the nitro-group, for instance with Raney nickel, the N-(4'-methoxy-3'-amino phenyl)-butane sultame may be obtained in very good yields. After recrystallizing from n-propanol the compound melts at 135° C.

*Example 26*

23 parts by weight of the sultame of p-aminophenyl amino-n-butane-1-sulfonic acid are dissolved in 500 parts by volume of water and 500 parts by volume of concentrated hydrochloric acid. The mixture is deazotized at about 0° C. by addition of 8 parts by weight of sodium nitrite. By pouring the solution into a solution of 15 parts by weight of β-naphthol in 500 parts by volume of 2-N-sodium hydroxide solution the corresponding azo compound is obtained, which after washing with water can be recrystallized from a mixture of water and acetone and yields red needles of the melting point 221–223° C.

Analogously the sultame of m-amino phenyl amino-n-butane-1-sulfonic acid can be converted into an azo compound with β-naphthol which azo compound consists of beautiful orange-red needles of the melting point 184°–185° C.

In the same manner 4-(2,4-diamino phenyl)-N-butane sultame can be diazotized yielding azo dyestuffs with phenols.

*Example 27*

14.4 grams of 6 amino quinoline, 20 grams of sodium acetate and 20 grams of 4-chloro butane sulfochloride are stirred vigorously at room temperature in 120 milliliters of water for eight hours. An oil is formed, which solidifies in crystals after a short period. The precipitate is filtered by suction and dissolved in 200 milliliters of water, containing 20 milliliters of a 30% sodium hydroxide solution. The solution is filtered and boiled for 30 minutes after the addition of a further 10 milliliters of sodium hydroxide solution. The oily residue which crystallizes soon is filtered by suction, dissolved in boiling dilute hydrochloric acid. The solution is rendered colorless by boiling up with charcoal and neutral by addition of sodium acetate solution, whereupon N-6-quinolyl butane sultame precipitates in colorless crystals of the melting point 140° C. The yield amounts to 9.5 grams.

If instead of the starting material described above 6 amino quinaldine is employed, N-6-quinaldyl butane sultame of the melting point 137° C. is obtained.

If 5-amino-isoquinoline is employed N-5-isoquinolyl butane sultame of the melting point 191° C. is obtained.

*Example 28*

38 grams of 3-amino pyridine are dissolved in 150° C. of ether. To this solution there are dropped 40 grams of 4-chloro-butane sulfochloride in 50 milliliters of ether and the mixture is stirred for 12 hours at room temperature. The precipitate is filtered by suction, washed with ether, stirred with 200 milliliters of water, again filtered by suction and then refluxed for one hour with 150 milliliters of a 10% sodium carbonate solution. The precipitate dissolves and finally an oil precipitates which solidifies upon cooling. By recrystallizing from water with the addition of some animal charcoal N-3-pyridyl butane sultame is obtained in colorless crystals of the melting point 102° C. The yield amounts to 27 grams.

In the same manner N-3-(6-methyl pyridyl)-butane sultame is obtained as a light yellow oil of the boiling point 216° C. at 6 mm. by employing as a starting material 3-amino-6-methyl-pyridine.

*Example 29*

14 grams of 8-amino quinoline are dissolved in 60 milliliters of pyridine. To this solution there are added while cooling 20 grams of 4-chloro butane sulfochloride. The solution is stirred for 12 hours at room temperature and then introduced into a mixture 1 liter of water and 100 milliliters of glacial acetic acid. The residue is sucked off and boiled with 250 milliliters of 5% sodium hydroxide solution for 30 minutes. An oil separates which solidifies upon cooling. After recrystallizing twice from ethanol N-8-quinolyl butane sultame melts at 124° C.

Analogously when using 6-amino-isoquinoline N-6-isoquinolyl butane sultame of the melting point 130° C., when using 5-amino quinoline N-5-quinolyl butane sultame of the melting point 164° C., when using 8-amino-methoxy quinoline N-8-(6-methoxy quinolyl)-butane sultame of the melting point 180° C. and when using 5-amino-8-acetamino-quinoline N-5-(8-amino-quinolyl)-butane sultame of the melting point 190° C. are obtained.

*Example 30*

20 grams of 4-chloro butane sulfochloride are gradually added to a solution of 30 grams of benzyl amine in 150 milliliters of ether. After stirring for three hours at room temperature the residue is sucked off, washed first with ether and then with water. The 4-chloro butane sulfonyl benzyl amine melts at 70° C. after recrystallizing from ether. It is boiled for 30 minutes with a 10% sodium carbonate solution. An oil precipitates which soldifies upon cooling. After washing with water, drying and recrystallizing from ether N-benzyl-butane sultame is obtained in colorless leaflets of the melting point 80° C.

Analogously N-β-phenyl ethyl butane sultame of the melting point 40° C. and the boiling point 220° C. at a pressure of 5 mm. is obtained from β-phenyl-ethyl amine.

*Example 31*

22 grams of β-pyridyl methyl amine are dissolved in 75 milliliters of ether. To this solution there are added with stirring 20 grams of 4-chloro butane sulfochloride in 25 milliliters of ether. After stirring for 12 hours the residue is filtered by suction, washed with ether, stirred with 200 milliliters of water and again filtered by suction. The 4-chloro butane sulfonyl-β-pyridyl methyl amine of the melting point 64° C. is boiled for 30 minutes in 150 milliliters of a 10% sodium carbonate solution. An oil precipitates which after cooling is taken up in methylene chloride. The methylene chloride solution is dried over sodium sulfate, the methylene chloride distilled off and the residue distilled in vacuo. The N-3-pyridyl-methyl-butane sultame distilled as a light yellow oil of the boiling point 214–220° C. at a pressure of 5 milliliters Hg and solidifies to large colorless crystals of the melting point 74° C.

*Example 32*

8.5 grams of p-nitro-benzyl amine hydrochloride are dissolved in 200 milliliters of water. To this solution there are added first 10 grams of 4-chloro-butane sulfochloride and then slowly 300 milliliters of a 10% sodium carbonate solution. After stirring for three hours the reaction product is subjected to sultame ring closure by boiling for an hour in a further 200 milliliters of a 10% sodium carbonate solution. N-(p-nitro-benzyl)-1,4-butane sultame precipitates upon cooling as an oil which solidifies quickly.

After washing with dilute hydrochloric acid, sodium hydroxide solution and water, and recrystallizing from methanol, it melts at 115–116° C. The yield amounts to 4.5 grams.

This nitro compound can be easily converted in good yields in methanol solution at room temperature into N-(p-amino-benzyl)-1,4-butane sultame by hydrogenation over Raney nickel. After recrystallization from methanol the amine melts at 151–152° C.

We claim:

The sultame of 4-(3-amino-phenyl-amino)-butane sulfonic acid.

References Cited in the file of this patent

UNITED STATES PATENTS 2,866,786   Feichtinger _____ Dec. 30, 1958

FOREIGN PATENTS 635,298   Germany _____ June 16, 1934
740,814   Germany _____ Oct. 28, 1943
752,227   Great Britain _____ July 4, 1956

OTHER REFERENCES

Mustafa: Chemical Reviews, vol. 54, p. 207 (1954).